(12) United States Patent
Tsuruma

(10) Patent No.: US 6,795,234 B2
(45) Date of Patent: Sep. 21, 2004

(54) WAVELENGTH CONVERTING ELEMENT AND METHOD OF MANUFACTURE THEREOF

(75) Inventor: Isao Tsuruma, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 438 days.

(21) Appl. No.: 09/985,092

(22) Filed: Nov. 1, 2001

(65) Prior Publication Data

US 2002/0051282 A1 May 2, 2002

(30) Foreign Application Priority Data

Nov. 1, 2000 (JP) ........................................ 2000-335052

(51) Int. Cl.[7] ............................................. G02F 1/365
(52) U.S. Cl. ...................................... 359/332; 385/122
(58) Field of Search ................... 385/122; 359/326–332

(56) References Cited

U.S. PATENT DOCUMENTS 5,285,508 A * 2/1994 Chikuma ..................... 385/30
5,943,465 A * 8/1999 Kawaguchi et al. ........ 385/122
2002/0048442 A1 * 4/2002 Kondo et al. ................ 385/129

FOREIGN PATENT DOCUMENTS

| JP | 09218431 A | 8/1997 | ............. G02F/1/37 |
| JP | 09281536 A | 10/1997 | ............. G02F/1/37 |
| JP | 2765112 | 4/1998 | ............ G02B/6/122 |
| JP | 11072810 A | 3/1999 | ............. G02F/1/37 |

* cited by examiner

*Primary Examiner*—John D. Lee

(57) ABSTRACT

A wavelength converting element having improved wavelength converting efficiency and having a beam shape which facilitates coupling to a fiber or the like, is manufactured at low cost. After a waveguide is formed by carrying out proton exchange at a lower substrate in which inverted domains are formed, an upper substrate is laminated to the lower substrate so as to oppose the waveguide. Thereafter, a heat treatment is carried out and protons diffuse into the upper substrate and the lower substrate such that the waveguide is made to be a waveguide whose refractive index distribution is symmetrical, and simultaneously, the upper substrate and the lower substrate are joined by the heat treatment.

12 Claims, 6 Drawing Sheets

WAVELENGTH CONVERTING ELEMENT AND METHOD OF MANUFACTURE THEREOF

BACKGROUND OF THE INVENTION

1. Field of the Invention

The present invention relates to a wavelength converting element and a method of manufacture thereof, and in particular, to a wavelength converting element which converts a fundamental wave to a second harmonic, and to a method of manufacturing the wavelength converting element.

2. Description of the Related Art

Conventionally, in a wavelength converting element, a waveguide is formed by a Ti thermal diffusion method or a proton exchange method. In these methods, because Ti or protons are diffused toward the interior from the surface of an optical crystal substrate, a flat waveguide which is formed from region having a high refractive index is formed in a vicinity of the surface. Accordingly, the shape of laser light which is guided in the waveguide is flat, and problems arise in the joining of the wavelength converting element with a lens or an optical fiber or the like. Further, because the second harmonic is confined at the high refractive index side with respect to the fundamental wave, there is the problem that there is little overlapping of the fundamental wave and the second harmonic, and the wavelength converting efficiency is poor.

In order to overcome these problems, a light waveguide in which a clad layer of a high refractive index is formed at a substrate surface is proposed in Japanese Patent Application Laid-Open (JP-A) No. 9-281536. Further, in JP-A No. 11-72810, a light waveguide, in which a high refractive index layer is formed in a vicinity of the surface of a substrate by carrying out proton exchange twice, is proposed. In these light waveguides, due to the high refractive index layer being formed at the surface of the substrate, the peak of the fundamental wave is moved to a vicinity of the substrate, and the overlapping with the second harmonic is made to be great, and the converting efficiency is increased. However, these structures are no different in that the vicinity of the substrate is a flat waveguide of a high refractive index. Because the peaks of the fundamental wave and the second harmonic do not coincide, the improvement in the wavelength converting efficiency is limited, and control of the beam shape is difficult.

On the other hand, Japanese Patent No. 2765112 proposes forming a light wavelength converting element having improved wavelength converting efficiency in which two substrates, in which inverted domains and waveguides are formed, are set to oppose one another, and their positions are made to match one another by an aligner, and the substrates are laminated together. However, although the converting efficiency of this light wavelength converting element is high, the two substrates must be fabricated separately by substantially the same process, and there is the problem that the manufacturing cost is high because the two substrates cannot be fabricated simultaneously. Further, at the time of laminating the two substrates together, because the light waveguides and the inverted domains themselves are transparent, it is difficult to visually confirm the respective positions of the substrates, and there is a problem that the light converting efficiency of the element deteriorates due to errors in alignment which arise due to the difficulty of visual confirmation.

SUMMARY OF THE INVENTION

The present invention has been proposed in order to overcome the above-described drawbacks, and an object of the present invention is to provide a wavelength converting element having a beam shape suitable for joining with a lens or an optical fiber, and a method of manufacturing the wavelength converting element in which a deterioration in yield is suppressed and the manufacturing costs are kept low.

A first aspect of the present invention is a wavelength converting element comprising: a lower substrate having a waveguide which is formed by proton exchange, and inverted domains which are formed periodically with respect to a light advancing direction of the waveguide; and an upper substrate which is laminated to the lower substrate so as to oppose the waveguide.

It is not necessary for a waveguide to be formed in the upper substrate in the same way as the lower substrate, and it suffices to, for example, merely wash the upper substrate. Further, due to the upper substrate being laminated to the lower substrate, the waveguide is positioned in a vicinity of the boundary surface between the upper substrate and the lower substrate. Accordingly, in this wavelength converting element provided with a waveguide, the waveguide is formed at the interior of the substrate. Thus, a deterioration in yield, which is due to chipping of edges at the time of polishing or handling, which is normally a problem in waveguide devices which are fabricated by diffusion from the surface, is suppressed. Further, a light loss due to dust or the like adhering to the waveguide can be prevented.

It is preferable that a thickness of the upper substrate is thinner than a thickness of the lower substrate. In this way, at the time of lamination, the upper substrate is deformed, and deformation of the lower substrate can be suppressed. As a result, changing of the phase matching condition due to distortion of the lower substrate can be suppressed.

Further, the waveguide may be formed by proton exchange in the lower substrate at which inverted domains are periodically formed, and the upper substrate may be laminated to the lower substrate so as to oppose the waveguide.

Without a special processing being carried out on the upper substrate, the upper substrate is laminated to the lower substrate so as to oppose the waveguide which is formed at the lower substrate. Because highly precise alignment is not required at this time, a decrease in the yield due to errors in alignment can be avoided.

Further, it is preferable that a heat treatment is carried out in a state in which the upper substrate and the lower substrate are laminated together, and protons, which are exchanged at the lower substrate, diffuse into the upper substrate, and simultaneously, the upper substrate and the lower substrate are joined. Due to the protons diffusing while the heat treatment is carried out, the upper substrate and the lower substrate can be strongly laminated together. Moreover, the waveguide can be formed in a vicinity of the boundary surface between the upper substrate and the lower substrate.

It is preferable that, before the lower substrate and the upper substrate are laminated together, a region between the lower substrate and the upper substrate is deaerated. By carrying out deaeration in this way, at the time of laminating the lower substrate and the upper substrate together, a generation of air pockets between the substrates can be prevented. Further, if a concave portion is formed in the surface of the substrate, the interior thereof is set in a state of reduced pressure, and because the lower substrate and the upper substrate are pressed by atmospheric pressure, both substrates are fit even more tightly together, and are difficult to peel apart from one another. Moreover, in a case in which air pockets caused by particles which are caught between the upper and lower substrates are formed, the air may expand during the heat treatment, and the upper and lower substrates may peel apart from each other over a wide range. However, by forming a concave portion, the expanded air can be absorbed at the concave portion. Therefore, peeling of the substrates from each other can be suppressed, and the yield improves.

The wavelength converting element relating to the present invention has a lower substrate having a waveguide which is formed by proton exchange, and inverted domains which are formed periodically with respect to the light advancing direction of the waveguide; and an upper substrate which is laminated to the lower substrate so as to oppose the waveguide. Thus, joining with a lens or a fiber is easy, and it is possible to obtain a beam shape of a high wavelength converting efficiency.

In the method of manufacturing a wavelength converting element relating to the present invention, an upper substrate is laminated to a lower substrate having a waveguide which is formed by proton exchange and inverted domains which are formed periodically with respect to the light advancing direction of the waveguide, such that the upper substrate opposes the waveguide. Thereafter, by carrying out a heat treatment, the protons diffuse into the upper and lower substrates, and simultaneously, the upper and lower substrates are joined together. In this way, abeam shape, which facilitates joining with a lens or fiber, and a waveguide wavelength converting element having high wavelength converting efficiency can be manufactured easily and at a high yield.

DETAILED DESCRIPTION OF THE PREFERRED EMBODIMENTS

Hereinafter, embodiments of the present invention will be described in detail with reference to the figures.

(First Embodiment)

Figure 1:
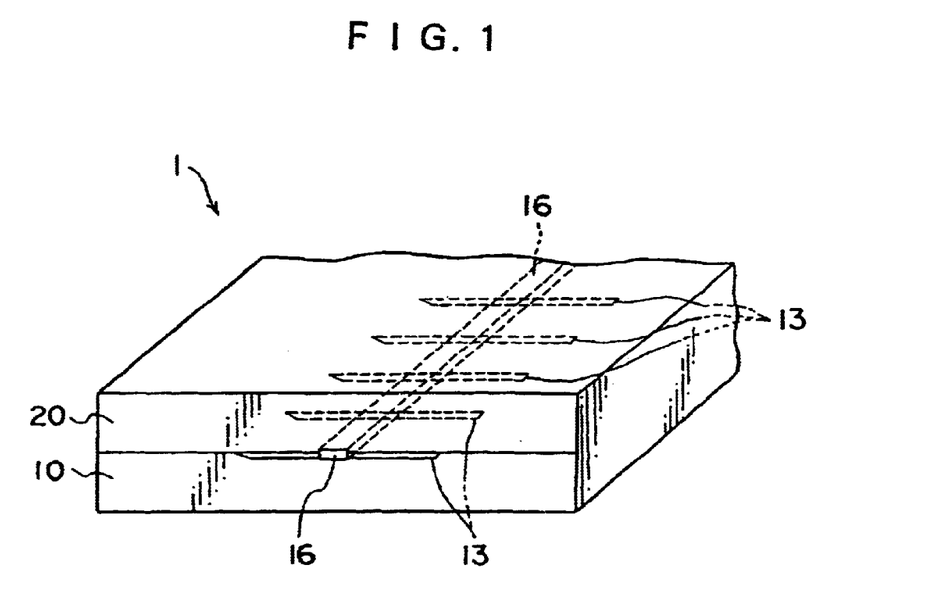
FIG. 1 is a schematic perspective view of a wavelength converting element relating to a first embodiment of the present invention.

As shown in FIG. 1, a wavelength converting element 1 relating to a first embodiment of the present invention has a lower substrate 10 and a upper substrate 20 which are joined so as to fit tightly to one another; a waveguide 16 which is formed between the lower substrate 10 and the upper substrate 20; and inverted domains 13 in which the orientation of spontaneous polarization is periodically inverted with respect to the light waveguiding direction.

Figure 2:
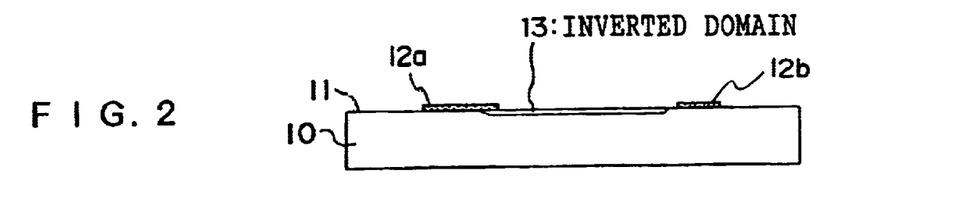
FIG. 2 is a diagram for explaining a state in which an inverted domain is formed at a lower substrate.

In manufacturing the wavelength converting element 1, as shown in FIG. 2, the X-cut substrate (hereinafter, "lower substrate") 10 of $LiNbO_3$ doped with MgO (MgO-LN) is used. An electrode pattern is formed by photolithography on a main surface 11 of the lower substrate 10. After vacuum deposition, comb-shaped reversal electrodes 12a, which are formed from Cr, and planar electrodes 12b, which correspond to the reversal electrodes 12a, are formed by using a lift-off method.

Figure 3:
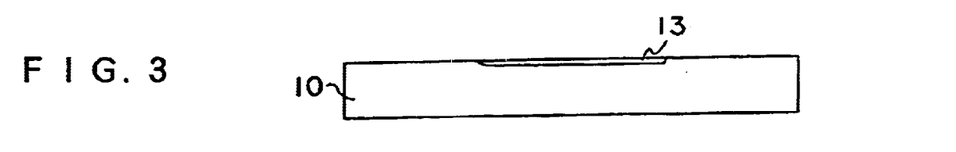
FIG. 3 is a diagram for explaining a state in which a reversal electrode is removed from the lower substrate by etching.

A predetermined voltage (for example, 2 kV) is applied between the reversal electrodes 12a and the planar electrodes 12b. The orientation of spontaneous polarization at the interior of the lower substrate 10 is thereby inverted, and the inverted domains 13 are formed. In this way, due to high voltage being applied to one pair of the reversal electrode 12a and the planar electrode 12b, the inverted domain 13 is periodically formed. Then, as shown in FIG. 3, the reversal electrode 12a and the planar electrode 12b, which are formed from Cr, are removed by etching.

Figure 4:
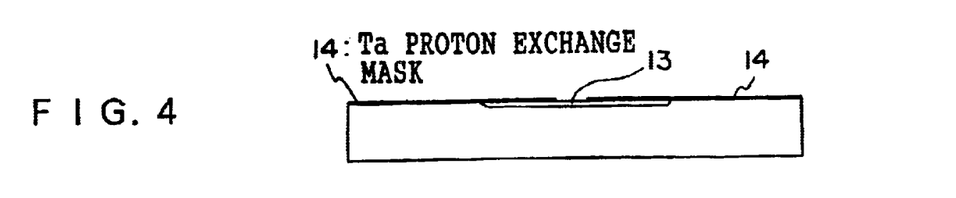
FIG. 4 is a diagram for explaining a state in which a proton exchange mask is formed on a main surface of the lower substrate.

Next, as shown in FIG. 4, a Ta proton exchange mask 14 is formed at a region, on the main surface 11 of the lower substrate 10, other than the region at which a waveguide 16 is to be formed. In this way, the position at which the waveguide 16 is to be formed and the width thereof are determined.

Figure 5:
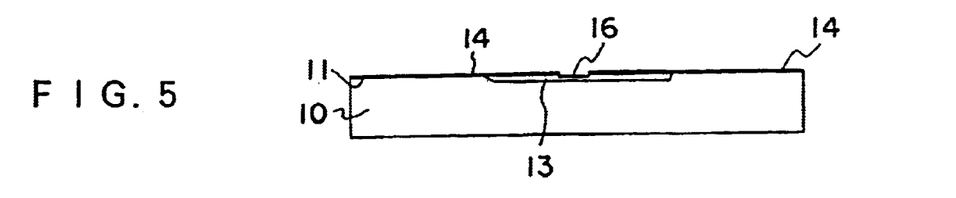
FIG. 5 is a diagram for explaining a state in which proton exchange is carried out.
Figure 6:
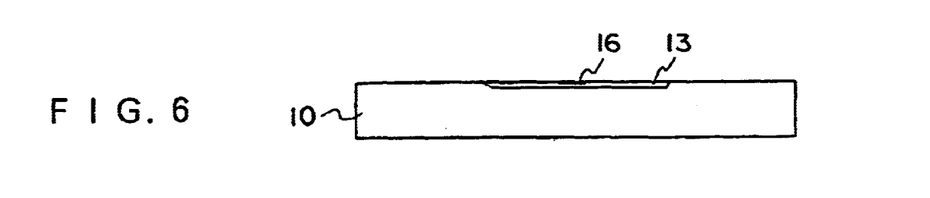
FIG. 6 is a diagram for explaining a state in which the proton exchange mask is removed.

The lower substrate 10 is immersed in pyrophosphoric acid which is heated to 150° C. to 200° C., and proton exchange is carried out. Note that the temperature of the pyrophosphoric acid is preferably 160° C., and the immersion time of the lower substrate 10 is preferably 60 minutes. In this way, as shown in FIG. 5, the waveguide 16 is formed at a region which is in a vicinity of the main surface 11 and at which the Ta proton exchange mask 14 is not formed. Then, the lower substrate 10 is immersed in mixed liquid of hydrofluoric acid and nitric acid, and as shown in FIG. 6, the Ta proton exchange mask 14 is removed.

Figure 7:
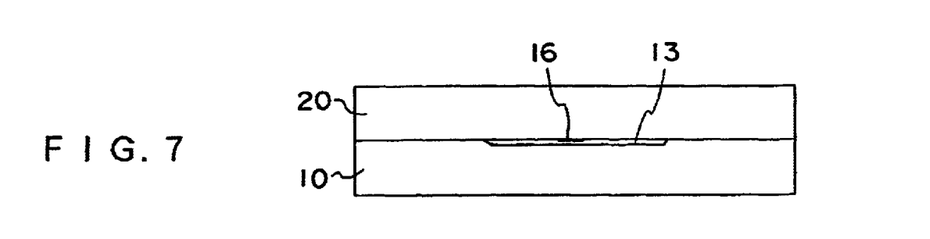
FIG. 7 is a diagram for explaining a state in which the lower substrate and an upper substrate are joined.

Next, as shown in FIG. 7, the upper substrate 20 which is a unprocessed optical crystal plate is laminated onto the lower substrate 10 such that the crystal axes match with the orientation flat as a reference. In this state, the lower substrate 10 and the upper substrate 20 are optically contacted. Note that the upper substrate 20 may be washed before the lower substrate 10 and the upper substrate 20 are laminated together.

Figure 8:
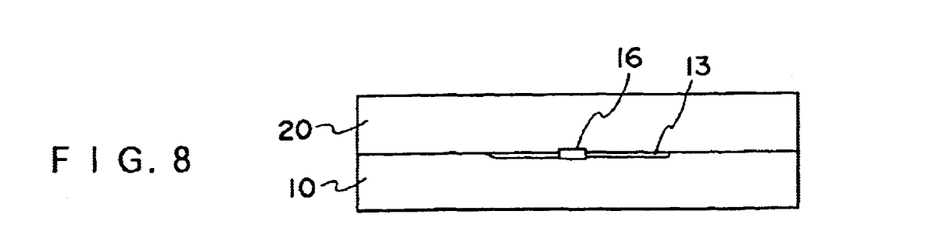
FIG. 8 is a diagram for explaining a state in which annealing processing is carried out and protons of the lower substrate diffuse into the upper substrate.

Thereafter, the lower substrate 10 and the upper substrate 20 are subjected to annealing processing for a predetermined time, for example, for 30 minutes to 90 minutes, in a furnace which is heated to a predetermined temperature of between 300° C. to 500° C., and are joined to one another. Simultaneously, the protons which are injected into the lower substrate 10 diffuse into the upper substrate 20. Thereafter, subsequent processes which are the same of those of conventional methods are carried out, and the element is completed. In this way, as shown in FIG. 1, the waveguide 16 is formed between the lower substrate 10 and the upper substrate 20.

As described above, in the method of manufacture of the wavelength converting element 1, no special processing is carried out on the upper substrate 20 which is laminated to the lower substrate 10, and merely a simple processing such as, for example, washing of the upper substrate 20, is carried out. Thus, an increase in the manufacturing costs is suppressed. Moreover, because highly-precise alignment is not necessary, a deterioration in yield caused thereby can be prevented.

Further, because the boundary surfaces of the lower substrate 10 and the upper substrate 20 are joined by thermal diffusion, the both substrates are strongly adhered to one another. Accordingly, the strength of the element with respect to mechanical forces such as dicing or polishing or the like can be improved.

Note that, with a conventional wavelength converting element, in a case in which the waveguide is formed at the surface of the substrate, there is the problem that the yield deteriorates due to chipping of the edges which occurs at the time of polishing or handling. In contrast, in the wavelength converting element 1, because the waveguide 16 is formed between the lower substrate 10 and the upper substrate 20, such a deterioration in yield can be avoided.

Further, in a conventional wavelength converting element in which the waveguide is formed at the surface of the substrate, a light loss arises due to the effects of particles or the like which adhere to the waveguide and become a cause of scattered light. In contrast, in the wavelength converting element 1, because particles do not directly adhere to the waveguide 16, such a light loss can be avoided.

Moreover, the present embodiment describes a case in which, after the reversal electrodes 12a and the planar electrodes 12b are removed, proton exchange by the Ta proton exchange mask 14 is carried out. However, proton exchange may be carried out with the reversal electrodes 12a and the planar electrodes 12b remaining, and thereafter, the reversal electrodes 12a and the planar electrodes 12b may be removed. In this case, alignment marks, which are formed at the same time of forming the reversal electrodes 12a and the planar electrodes 12b, may be used in the aligning for forming the Ta proton exchange mask 14, and the accuracy of the positions of the inverted domains 13 and the waveguide 16 can be improved.

(Second Embodiment)

Next, a second embodiment of the present invention will be described.

Figure 9:
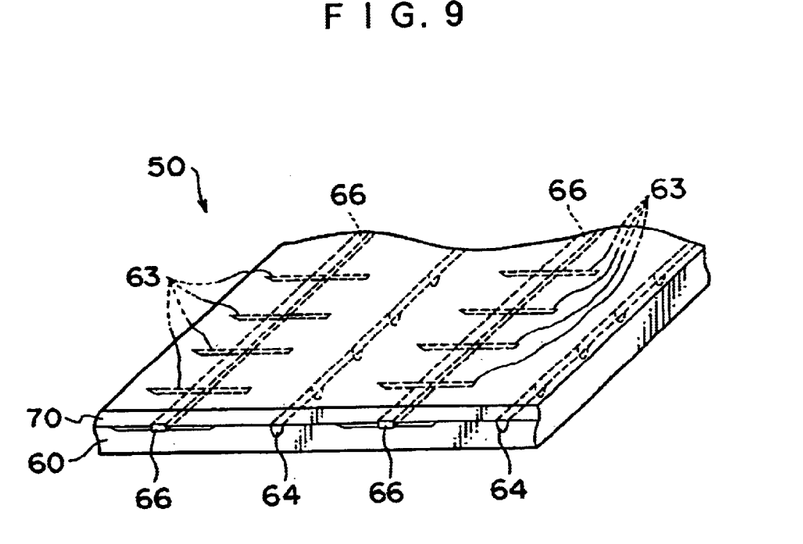
FIG. 9 is a perspective view showing a structure of a wavelength converting element relating to a second embodiment of the present invention.

As shown in FIG. 9, a wavelength converting element 50 relating to the present embodiment has a lower substrate 60 and a upper substrate 70 which are joined together so as to be fit tightly to one another; waveguides 66 which are formed between the lower substrate 60 and the upper substrate 70; inverted domains 63 in which the orientation of spontaneous polarization is periodically inverted with respect to the light waveguiding direction; and isolation grooves 64. Note that the thickness of the upper substrate 70 is preferably less than the thickness of the lower substrate 60.

Figure 10:
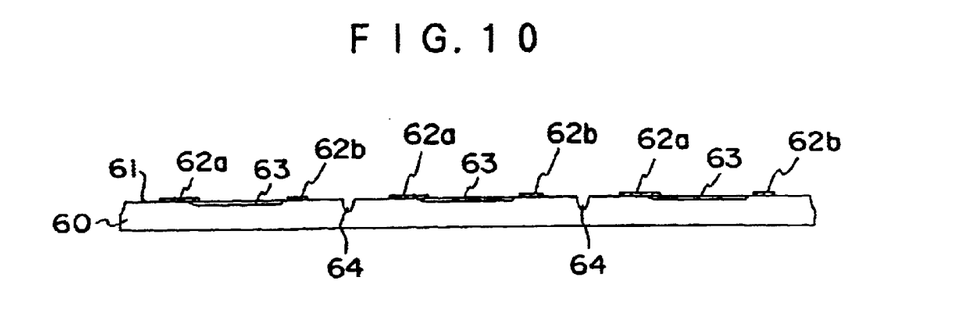
FIG. 10 is a diagram for explaining a state in which inverted domains are formed at a lower substrate.

As shown in FIG. 10, the wavelength converting element 50 uses the lower substrate 60 which is an X-cut substrate of MgO-LN which is doped with MgO. An electrode pattern is formed by photolithography on the main surface of the lower substrate 60. After vacuum deposition of Cr, lift-off is carried out, and comb-shaped reversal electrodes 62a and planar electrodes 62b which correspond to the reversal electrodes 62a are formed.

Here, in order for the electrical field, which is generated by applying high voltage which will be described later between a set of the reversal electrode 62a and the planar electrode 62b, not to affect the region between the adjacent pair of the reversal electrode 62a and the planar electrode 62b, as shown in FIG. 10, the isolation groove 64 is formed between the reversal electrodes 62a of any given set and the planar electrodes 62b of the set which is adjacent thereto.

First, on the lower substrate 60 on which the plurality of pairs of the electrodes 62a, 62b are formed, a thick-film resist, e.g., a resist film such as a dry film resist whose thickness is several tens of μm is formed. Then, a resist pattern is formed by exposure and development, such that a portion between the reversal electrodes 62a and the planar electrodes 62b adjacent thereto is exposed. Sandblast processing is carried out by using the resist pattern as a mask, such that a groove is formed between the reversal electrodes 62a and the planar electrodes adjacent thereto. Thereafter, the resists are removed. In this way, the electrical field which is generated between the electrodes of each pair is completely isolated so as not to affect other pairs, and the respective inverted domains 63 are formed stably.

Note that the isolation grooves 64 are preferably formed at regions other than vicinities of the peripheral end portions of the lower substrate 60. This is because, if the isolation groove 64 is formed in a vicinity of the peripheral end portion of the lower substrate 60, air enters in from the isolation groove 64 after the lower substrate 60 and the upper substrate 70 have been joined, and deaerating of the regions between substrates, which will be described later, becomes difficult.

Figure 11:
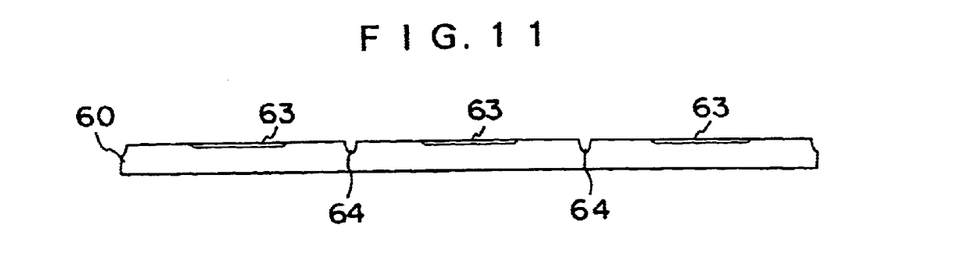
FIG. 11 is a diagram for explaining a state in which reversal electrodes are removed from the lower substrate by etching.

Then, a predetermined voltage (for example, 2 kV) is applied between the reversal electrodes 62a and the planar electrodes 62b, and the inverted domains 63 are periodically formed. Note that the application of high voltage between the reversal electrode 62a and the planar electrode 62b may be carried out on the respective pairs simultaneously or successively. Then, as shown in FIG. 11, the reversal electrodes 62a of Cr and the planar electrodes 62b are removed by etching.

Figure 12:
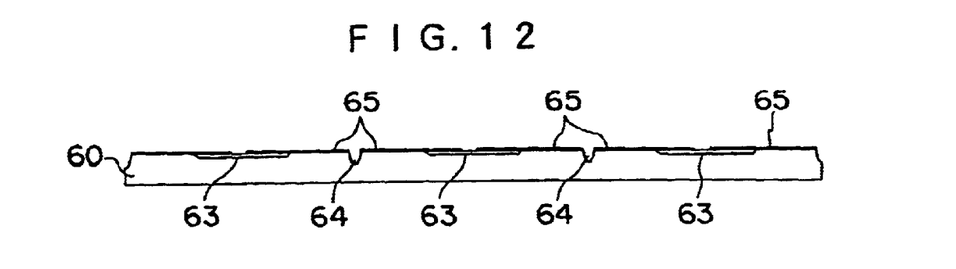
FIG. 12 is a diagram for explaining a state in which a proton exchange mask is formed on a main surface of the lower substrate.

Next, as shown in FIG. 12, at a main surface 61 of the lower substrate 60, Ta proton exchange masks 65 are formed at regions other than the regions at which the waveguides are to be formed. In this way, the positions at which the waveguides 66 are to be formed and the widths thereof are determined.

Figure 13:
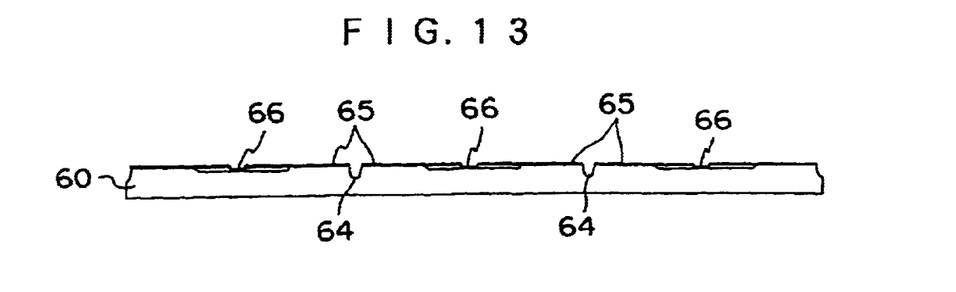
FIG. 13 is a diagram for explaining a state in which proton exchange is carried out.
Figure 14:
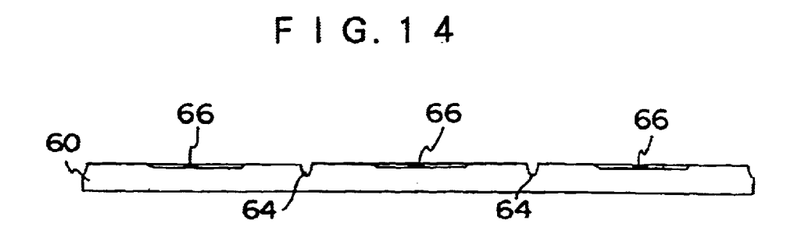
FIG. 14 is a diagram for explaining a state in which the proton exchange mask is removed.

The lower substrate 60 is immersed in pyrophosphoric acid which is heated to 150° C. to 200° C., and proton exchange is carried out. Note that the temperature of the pyrophosphoric acid is 160° C., and the immersing time of the lower substrate 60 is 90 minutes. In this way, as shown in FIG. 13, the waveguides 66 can be formed at regions which are in a vicinity of the main surface and at which the Ta proton exchange masks 65 are not formed. Then, the lower substrate 60 is immersed in a mixed liquid of hydrofluoric acid and nitric acid, and as shown in FIG. 14, the Ta proton exchange masks 65 are removed.

Figure 15:
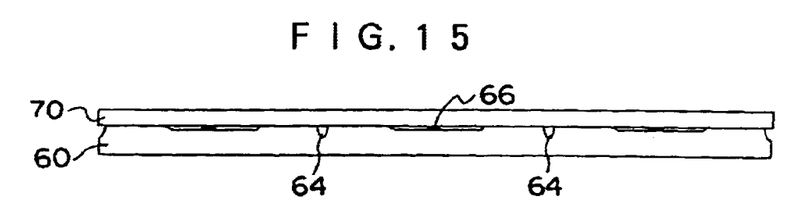
FIG. 15 is a diagram for explaining a state in which an air layer between the lower substrate and an upper substrate is removed, and the lower substrate and the upper substrate are joined.

Next, as shown in FIG. 15, the upper substrate 70, which is an unprocessed or a washed optical crystal plate, is disposed with respect to the lower substrate 60 such that the crystal axes match with the orientation flat as a reference. In aligning the lower substrate 60 and the upper substrate 70, alignment marks which are formed at the same time as the isolation grooves 64 may be used. Then, the regions between the lower substrate 60 and the upper substrate 70 are deaerated, and the lower substrate 60 and the upper substrate 70 are laminated together. Due to the deaeration, the inner portions of the isolation grooves 64 are set in a state of reduced pressure, and because the lower substrate 60 and the upper substrate 70 are pressed by atmospheric pressure, it is difficult to peel the substrates 60, 70 apart from one another. Further, the upper substrate 70 is preferably thinner than the lower substrate 60, e.g., is a thickness of 0.3 mm of less, so as to sufficiently be fit tightly to the lower substrate 60 even in a state in which particles are caught between the upper substrate 70 and the lower substrate 60.

Figure 16:
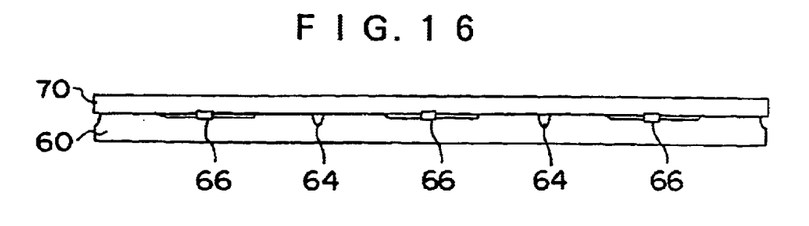
FIG. 16 is a diagram for explaining a state in which annealing processing is carried out and protons of the lower substrate diffuse into the upper substrate.

Then, the lower substrate 60 and the upper substrate 70 are subjected to annealing processing for a predetermined time of 30 minutes to 90 minutes in a furnace which is heated to a predetermined temperature of 300° C. to 400° C., such that the lower substrate 60 and the upper substrate 70 are joined to one another. Simultaneously, the protons which have been injected in the lower substrate 60 diffuse into the upper substrate 70. Thereafter, the substrates which are joined together are separated into elements by a dicing saw. At this time, the isolation grooves 64 or the alignment marks which are formed at the same time as the isolation grooves 64 may be used in the aligning at the time of cutting. Thereafter, subsequent processes which are the same of those of conventional methods are carried out, and the elements are completed. In this way, as shown in FIG. 16, the waveguides 66 are formed in a vicinity of the boundary surface between the lower substrate 60 and the upper substrate 70.

In the wavelength converting element 50 which is manufactured as described above, the protons which have entered into the lower substrate 60 by proton exchange diffuse into both the upper substrate 70 and the lower substrate 60 due to the heat treatment. Thus, a symmetrical waveguide which has a peak of refractive indices in a vicinity of the joined boundary surface between the upper substrate 70 and the lower substrate 60 is formed. In this way, the overlapping of the fundamental wave and the second harmonic can be made to be great, and the wavelength converting efficiency can be improved.

Further, because the waveguide 66 is a symmetrical waveguide, the flatness of the beam shape of the second harmonic is improved, and coupling of the exiting light with a lens or optical fiber is facilitated.

Further, in the wavelength converting element 50, due to the upper substrate 70 being made to be thin, and moreover, due to the regions between the lower substrate 60 and the upper substrate 70 being deaerated, even if there is a state in which particles are caught between the both substrates, the upper substrate 70 deforms, and the both substrates are easily fixed tightly together. In this way, deformation of the lower substrate 60 can be suppressed, and changing of the phase matching condition of the element due to distortion can be decreased. Further, because the regions between the lower substrate 60 and the upper substrate 70 are deaerated, a situation can be prevented in which a space is formed between the both substrates due to particles, and air remains in this space, and this air thermally expands during the annealing processing, and portions of the substrates at the periphery of this portion peel away from one another. Thus, the yield is improved.

In the method of manufacturing the wavelength converting element 50, because the isolation grooves 64 are formed in the lower substrate 60, the plurality of elements within a wafer can use different inverted domains. Further, by using the isolation grooves 64 as alignment marks, the process of forming alignment marks at the upper substrate 70, which process was conventionally carried out, is omitted. The number of process is reduced and the precision is improved.

Further, in the wavelength converting element 50, in the same way as in the first embodiment, the problem of conventional wavelength converting elements of the waveguide being formed at the surface of the substrate, i.e., the problem of the yield deteriorating due to the chipping of edges which occurs at the time of polishing or handling, can be avoided.

Moreover, in the wavelength converting element 50, because particles which are cause of scattered light do not directly adhere to the waveguide 66, the conventional problem of light loss occurring due to the adhesion of particles can be overcome.

Note that the present invention is not limited to the embodiments which are described above, and for example, may be structured as described hereinafter.

For example, in the second embodiment, the isolation grooves 64 are formed by using sandblasting. However, etching or ion milling or the like may be used. Further, in the above-described second embodiment, after the reversal electrodes 62 are removed by etching, the Ta proton exchange masks 65 are formed. However, in the same way as in the first embodiment, the Ta proton exchange masks 65 may be formed without removing the reversal electrodes 62, and thereafter, the reversal electrodes 62 may be removed after the Ta proton exchange masks 65 are removed.

Further, in the first and the second embodiments, after the inverted domains are formed, the waveguides are formed. However, the effects of the present invention are not adversely affected if the order of processes is such that the inverted domains are formed after the waveguides are formed.

What is claimed is:

1. A wavelength converting element comprising:
    a lower substrate having a waveguide which is formed by proton exchange, and inverted domains which are formed periodically with respect to a light advancing direction of the waveguide; and
    an upper substrate which is laminated to the lower substrate so as to oppose the waveguide.

2. A wavelength converting element according to claim 1, wherein a thickness of the upper substrate is thinner than a thickness of the lower substrate.

3. A method of manufacturing a wavelength converting element comprising the steps of:
    forming a waveguide by carrying out proton exchange at a lower substrate at which inverted domains are periodically formed; and
    laminating an upper substrate to the lower substrate such that the upper substrate opposes the waveguide.

4. A method of manufacturing a wavelength converting element according to claim 3, wherein a heat treatment is carried out in a state in which the upper substrate and the lower substrate are laminated together, and protons, which are exchanged at the lower substrate, diffuse into the upper substrate, and simultaneously, the upper substrate and the lower substrate are joined.

5. A method of manufacturing a wavelength converting element according to claim 3, wherein at one of the upper substrate and the lower substrate, a region which is concave with respect to an opposing substrate surface is formed.

6. A method of manufacturing a wavelength converting element according to claim 4, wherein at one of the upper substrate and the lower substrate, a region which is concave with respect to an opposing substrate surface is formed.

7. A method of manufacturing a wavelength converting element according to claim 3, wherein, before the lower substrate and the upper substrate are laminated together, a region between the lower substrate and the upper substrate is deaerated.

8. A method of manufacturing a wavelength converting element according to claim 4, wherein, before the lower substrate and the upper substrate are laminated together, a region between the lower substrate and the upper substrate is deaerated.

9. A method of manufacturing a wavelength converting element according to claim 5, wherein, before the lower substrate and the upper substrate are laminated together, a region between the lower substrate and the upper substrate is deaerated.

10. A method of manufacturing a wavelength converting element according to claim 6, wherein, before the lower substrate and the upper substrate are laminated together, a region between the lower substrate and the upper substrate is deaerated.

11. A method of manufacturing a wavelength converting element comprising the steps of:

preparing a lower substrate of $LiNbO_3$ doped with MgO;

forming comb-shaped reversal electrodes and, planar electrodes, which correspond to the reversal electrodes, on a main surface of said lower substrate;

applying a predetermined voltage between the reversal electrodes and the planar electrodes so as to invert the orientation of spontaneous polarization at the interior of said lower substrate and to form inverted domains;

removing the reversal electrodes and the planar electrodes by etching;

forming a Ta proton exchange mask at a region, on the main surface of said lower substrate, other than the region at which a waveguide is to be formed;

immersing the lower substrate in pyrophosphoric acid which is heated to 150° C. to 200° C., and carrying out proton exchange so as to form a waveguide at a region at which the Ta proton exchange mask is not formed;

removing the Ta proton exchange mask;

laminating the upper substrate which is a unprocessed optical crystal plate onto the lower substrate such that the crystal axes match with the orientation flat as a reference so as to optically contact the lower substrate and the upper substrate; and annealing the lower substrate and the upper substrate, which are laminated to each other, for a predetermined time in a furnace which is heated to a predetermined temperature of between 300° C. to 500° C., so as to join the substrates to one another and simultaneously to diffuse the protons, which are injected into the lower substrate, into the upper substrate.

12. A method of manufacturing a wavelength converting element according to claim 11, the method further comprising a step of washing said upper substrate before said lower substrate and said upper substrate are laminated together.

* * * * *